(12) United States Patent
Bellanger

(10) Patent No.: US 11,523,180 B2
(45) Date of Patent: Dec. 6, 2022

(54) METHOD FOR DISPLAYING AN ANIMATION DURING THE STARTING PHASE OF AN ELECTRONIC DEVICE AND ASSOCIATED ELECTRONIC DEVICE

(71) Applicant: SAGEMCOM BROADBAND SAS, Rueil Malmaison (FR)

(72) Inventor: Julien Bellanger, Rueil Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 91 days.

(21) Appl. No.: 16/080,394

(22) PCT Filed: Feb. 27, 2017

(86) PCT No.: PCT/EP2017/054491
§ 371 (c)(1),
(2) Date: Aug. 28, 2018

(87) PCT Pub. No.: WO2017/148856
PCT Pub. Date: Sep. 8, 2017

(65) Prior Publication Data
US 2019/0087200 A1 Mar. 21, 2019

(30) Foreign Application Priority Data
Feb. 29, 2016 (FR) ...................... 1651662

(51) Int. Cl.
*H04N 21/443* (2011.01)
*G06T 13/00* (2011.01)
(Continued)

(52) U.S. Cl.
CPC ....... *H04N 21/4432* (2013.01); *G06F 9/4401* (2013.01); *G06F 9/445* (2013.01);
(Continued)

(58) Field of Classification Search
CPC .......... H04N 21/4432; H04N 21/42692; G06F 9/4406; G06F 9/4401; G06F 9/445; G06F 11/321; G06F 11/328; G06T 13/00
(Continued)

(56) References Cited

U.S. PATENT DOCUMENTS

| 4,404,554 | A | | 9/1983 | Tweedy et al. |
| 5,608,424 | A | * | 3/1997 | Takahashi ............... G06T 13/00 345/467 |

(Continued)

FOREIGN PATENT DOCUMENTS

| CN | 1 917 571 A | 2/2007 |
| CN | 101 827 199 A | 9/2010 |

OTHER PUBLICATIONS https://www.youtube.com/watch?v=wiBpYCOemTE, Youtube, pp. 1. (Year: 2017).*

(Continued)

*Primary Examiner* — Gregory Todd
(74) *Attorney, Agent, or Firm* — Pillsbury Winthrop Shaw Pittman LLP

(57) ABSTRACT

A method for displaying an animation by a display chip of an electronic device, which includes a non-volatile memory and a random-access memory. The display chip includes a video output register and a display register. The method includes a first static programming phase including configuring the video output register; writing n images in the memory, n being an integer higher than or equal to two; writing into the memory of a plurality of nodes, such that each node includes the address in the memory of at least one portion of an image, as well as the address of the following node in the memory, the last node including the address in the random-access memory of the first node; and configuring the display register. The method also includes a second (Continued)

phase in which the n images are read by the display chip by the display register, to display the animation.

9 Claims, 4 Drawing Sheets

(51) Int. Cl.
| | | |
|---|---|---|
| *H04N 21/426* | (2011.01) | |
| *G06F 9/4401* | (2018.01) | |
| *G06F 11/32* | (2006.01) | |
| *G06F 9/445* | (2018.01) | |
| *G09G 5/00* | (2006.01) | |
| *H04L 49/9015* | (2022.01) | |
| *G06F 3/14* | (2006.01) | |
| *G09G 5/395* | (2006.01) | |

(52) U.S. Cl.
CPC .......... *G06F 9/4406* (2013.01); *G06F 11/321* (2013.01); *G06F 11/328* (2013.01); *G06T 13/00* (2013.01); *H04N 21/42692* (2013.01); *G06F 3/14* (2013.01); *G09G 5/001* (2013.01); *G09G 5/395* (2013.01); *G09G 2330/026* (2013.01); *H04L 49/9015* (2013.01)

(58) Field of Classification Search
USPC ............................................................ 713/2
See application file for complete search history.

(56) References Cited

U.S. PATENT DOCUMENTS

| | | | | |
|---|---|---|---|---|
| 6,178,503 B1 * | 1/2001 | Madden | ................... | G06F 1/24 710/8 |
| 6,556,193 B1 * | 4/2003 | Auld | ................... | G06T 3/4007 345/418 |
| 6,560,702 B1 * | 5/2003 | Gharda | ................... | G06F 8/60 709/221 |
| 6,791,572 B1 * | 9/2004 | Cloney | ................ | G06F 9/4401 345/619 |
| 7,464,258 B2 * | 12/2008 | Chang | ................... | G06F 9/4401 713/1 |
| 7,987,348 B2 * | 7/2011 | Swanson | ............... | G06F 9/4403 711/153 |
| 9,778,937 B1 * | 10/2017 | Sivertsen | ......... | H04N 21/44004 |
| 2007/0110408 A1 * | 5/2007 | Chang | ...................... | H04N 5/85 386/331 |
| 2008/0001970 A1 | 1/2008 | Herrick et al. | | |
| 2010/0079472 A1 * | 4/2010 | Shang | ................... | G06F 9/4401 718/1 |
| 2010/0220743 A1 | 9/2010 | Endo et al. | | |
| 2014/0223158 A1 * | 8/2014 | Zhou | ..................... | G06F 9/4405 713/2 |
| 2014/0363144 A1 * | 12/2014 | Zhou | ..................... | G06F 9/4406 386/355 |
| 2015/0109310 A1 * | 4/2015 | Ayanam | ................... | G06T 1/60 345/505 |

OTHER PUBLICATIONS

Windows Seven Forums, "How to change boot animation in Windows 7",https://www.sevenforums.com/customization/106861-how-change-boot-animation-windows-7-a.html, Windows Seven Forums, pp. 1-19. (Year: 2010).*

International Search Report as issued in International Patent Application No. PCT/EP2017/054491, dated Mar. 29, 2017.

"Buffer Mechanism for PEL Positioning of Muptiple Video Images, Including Overlapping, On a Raster-Scan CRT," 700 IBM Technical Disclosure Bulletin, vol. 29, No. 11, Apr. 1987, XP002088245, pp. 4714-4717.

* cited by examiner

METHOD FOR DISPLAYING AN ANIMATION DURING THE STARTING PHASE OF AN ELECTRONIC DEVICE AND ASSOCIATED ELECTRONIC DEVICE

CROSS-REFERENCE TO RELATED APPLICATIONS

This is the U.S. National Stage of PCT/EP2017/054491, filed Feb. 27, 2017, which in turn claims priority to French Patent Application No. 1651662, filed Feb. 29, 2016, the entire contents of all applications are incorporated herein by reference in their entireties.

TECHNICAL DOMAIN OF THE INVENTION

The technical domain of the invention is that of electronic devices intended to be connected to a display means. The present invention relates to a method for displaying an animation by an electronic device for a terminal and in particular a method for displaying an animation during the starting phase of an electronics package. The invention also relates to a device for carrying out said method.

TECHNOLOGICAL BACKGROUND OF THE INVENTION

The starting of an electronic device is achieved in several steps. First of all the elementary input/output system initialises the random-access memory. Once the initialisation step has finished, the elementary input/output system loads a starting program or boot program into the random access memory. The role of this boot program is to initialise the peripheral devices, such as a display chip, and to load the operating system into the random access-memory. However, the operating system which operates the device is not immediately operational. Consequently during the first moments following starting of the device, the operating system does not yet have access to the display chip drivers and therefore cannot control the display chip to provide information, for example, on the progress of the starting phase. During these first moments, however, the boot program may be programmed to configure the video output registers statically in order to display an image which shows that the device is starting.

In order to produce an image, a display chip generally has two registers: a video output register and a display register. The video output register can be configured to carry out a progressive display or an interlaced display. When the video output register is configured for a progressive display, the display of an image is performed line by line. When the video output register is configured for an interlaced video, the image is divided into a first frame called the odd frame which comprises the odd lines of the image and a second frame called the even frame which comprises the even lines of the image, and display of the image is achieved first of all by displaying the odd frame then by displaying the even frame. The display register contains a chained configuration table, otherwise known as a node, this node comprising in particular the memory address of the image (in the case of a display using progressive mode) or of the frame to be displayed (in the case of an interlaced mode), where the configuration of the display register is conditional upon the choice of display mode through the video output register.

In the context of a progressive display, the node contained in the display register comprises not only the memory address of the image to be displayed, but also its own address, or in other words the node points to itself. The display is therefore carried out by continuously scanning the node.

In the context of an interlaced display, the display register contains a first node comprising the address of the odd frame of the image to be displayed and allows the odd lines of this image to be displayed. This first node also comprises the memory address of the second node. The second node contains the address of the even frame of the image to be displayed and allows the even lines of this image to be displayed. This second node also comprises the memory address of the first node. The display is therefore achieved by scanning the first node then scanning the second node, leading to the display of the odd lines and then of the even lines of the image to be displayed. Thus, in contrast to progressive display, the display alternates between the display of the odd lines (or odd frame) and the display of the even lines (or even frame) of the same image.

However, since the programming of the registers static, it is not possible to display an animation, since an animation requires at least two images. A known technique is therefore to display a static image during the starting phase, where the display of this image can occur either by means of a display in interlaced mode, or by means of a display in progressive mode. The animation can therefore only appear on the display device when the operating system has access to the display chip drivers. Depending on the operating system and on the security measures used, this animation only appears 5 to 15 seconds after actual start-up of the electronic device. During this interval, users frequently take the fixed image for a malfunction of the electronics package and disconnect the latter during the starting sequence.

A need therefore exists which is associated with the display of an animation during the very first moments of the starting phase of an electronic device; that is, before the operating system takes control of the display, indicating that said starting is proceeding correctly.

SUMMARY OF THE INVENTION

The invention offers a solution to the problems stated above, by proposing a programming method which allows an animation to be displayed from the first moments of the starting phase.

In order to achieve this, the invention proposes a method for the display of an animation by the display chip of an electronic device, said electronic device comprising a non-volatile memory and a random-access memory, said display chip comprising a video output register and a display register; where the method comprises a first static programming phase comprising:
 a step for configuration of the video output register;
 a step for writing n images in the random access memory, where n is an integer equal to or greater than two;
 a step for writing a plurality of nodes into the random-access memory such that each node comprises the random-access memory address of at least a part of one image amongst the n images, as well as the random access memory address of the following node, with the last node comprising the random access memory address of the first node;
 a step for configuration of the display register.

The method also comprises a second phase for reading of n images by said display chip, said reading being achieved using the display register so as to display said animation.

Thus the n images are successively displayed, generating an animation from the first moments that the device is started up. Given that each node also comprises an address of at least one part of one image from amongst the n images, the display of a succession of images is obtained which gives rise to an animation. The phase 'at least one part of one image' is meant to convey that a node can contain the memory address of an even or odd frame of an image or the memory address of an image. Moreover, the animation is based on static programming of the display registers and ingeniously takes advantage of the progressive or interlaced reading mode in order to display an animation. It is therefore not necessary to adapt the display chip to the method of the invention.

The invention also proposes an electronic device comprising a non-volatile memory, a random-access memory and a display chip, said display chip comprising a video output register and a display register. The device moreover comprises means for implementing the method according to the invention.

The term 'electronic device' relates to any electronic device intended to be connected to a means of display. The electronic device according to the invention may, for example, consist of an electronics package intended to be connected to a television, such as a STB (Set Top Box). Alternatively, the display device may be incorporated in the electronic device. For example, the electronic device according to the invention may consist of a Smartphone. Moreover, the term display chip relates to a chip which in particular comprises one or more means of connection to a display device. For example, the display chip may comprise a HDMI or VGA port.

The invention also proposes a computer program product comprising instructions which lead the device according to the invention to execute the steps of the display method according to the invention.

The invention also proposes a support which can be read by a computer on which the computer program according to the invention is recorded.

In addition to the characteristics that have been listed in the previous paragraph, the display method according to one aspect of the invention may exhibit one or more additional characteristics from amongst the following, either considered individually or according to all technically feasible combinations.

Advantageously, a starting program which is in charge of starting an operating system is stored in the non-volatile memory, with the electronic device comprising an elementary input/output system configured to load said starting program into the random-access memory, where the n images are included in said starting program such that the step for writing the n images into the random-access memory is carried out during loading of said starting program by said elementary input/output system.

Thus the loading into memory of the starting program and of the images comprising the animation that is to be displayed are carried out in a single step.

Advantageously, the step for configuring the video output register and the display register is carried out by the elementary input/output system. Thus the animation can be displayed as soon as the starting program is loaded.

Alternatively, a starting program which is in charge of starting an operating system is stored in the non-volatile memory, with the electronic device comprising an elementary input/output system configured to load said starting program into the random-access memory, where the n images are stored in the non-volatile memory and the step for writing the n images into the random-access memory is carried out by the starting program copying the images stored in the non-volatile memory to the random-access memory.

Thus it is possible to obtain an animation comprising a large number of images without necessarily slowing down the loading of the starting program, with the loading into memory of the latter being carried out independently of loading of the images comprising the animation.

Advantageously, the step for configuring the video output register and the display register is carried out by the starting program. Thus the animation can be displayed as soon as the starting program is loaded.

Advantageously the n images are stored in the form of compressed images. Thus the memory footprint of the compressed images is thus reduced.

Preferably, the writing of the n images into the random-access memory is carried out in a reserved zone of the random-access memory. Thus the allocation of memory space containing the images to the operating system is avoided during loading. The animation can therefore continue even after the operating system is loaded, which allows the operating system time to load the display chip drivers. Therefore interruption of the animation during the starting phase is avoided.

Advantageously, the configuration of the video output register during the video output register configuration step is carried out such that the display is carried out in progressive mode and such that each node comprises the address of an image.

Thus an animation of better quality is obtained than an animation of the same resolution in interlaced mode.

Advantageously, the animation is broken down into a first graphics plane and into a second graphics plane, where the first graphics plane constitutes a fixed part of the animation and the second graphics plane constitutes a changing part of the animation, where the display chip comprises means for superimposing the first graphics plane and the second graphics plane; and in that the step for writing a plurality of nodes into random-access memory comprises two sub-steps:

a first sub-step for writing a node comprising the random-access address MV of an image intended to be displayed in the first graphics plane, where the node moreover comprises its own address in random-access memory MV;

a second sub-step for writing a plurality of nodes Ni, each node comprising the random access memory address MV of an image intended to be displayed in the second graphics plane as well as the random-access memory address MV of the following node, with the last node comprising the random-access memory address MV of the first node.

Advantageously the configuration of the video output register during the video output register configuration step is carried in interlaced mode, with the plurality of nodes comprising even nodes and odd nodes, and each odd node comprising the address of an odd image frame and each even node comprising the address of an even image frame.

The use of the interlaced mode allows an animation to be displayed in high resolution even if the bandwidth of the video connection linking the display chip to a means of display is low.

Advantageously the animation is broken down into a first graphics plane and into a second graphics plane, where the first graphics plane constitutes a fixed part of the animation and the second graphics plane constitutes the changing part of the animation, where the display chip comprises means for superimposing the first graphics plane onto the second graphics plane; and in that the step for writing a plurality of nodes into random-access memory comprises two sub-steps:
  a first sub-step for writing a first node and a second node, where the first node comprises the random-access memory address of the odd frame of an image intended to be displayed in the first graphics plane as well as the random-access memory address of the second node, the second node comprising the random-access memory address of the even frame of the image intended to be displayed in the first graphics plane as well as the so random-access memory address of the first node;
  a second sub-step for writing a plurality of nodes, where each odd node comprises the random-access memory address of the odd frame of an image intended to be displayed in the second graphics plane and each even node comprises the random-access memory address of the even frame of an image intended to be displayed in the second graphics plane, where the last node comprises the random-access memory address of the first node.

Thus the storage in memory of redundant elements between two images is avoided, where the redundant elements make up the fixed part of the animation. Use of an animation which takes the first graphics plane and the second graphics plane into consideration, thus saving memory.

DESCRIPTION OF FIGURES

The figures are given for indication purposes and in no way restrict the invention, and show.

DETAILED DESCRIPTION OF AT LEAST ONE EMBODIMENT OF THE INVENTION

Unless otherwise specified, a given element appearing in different figures has a unique reference.

Figure 1A:
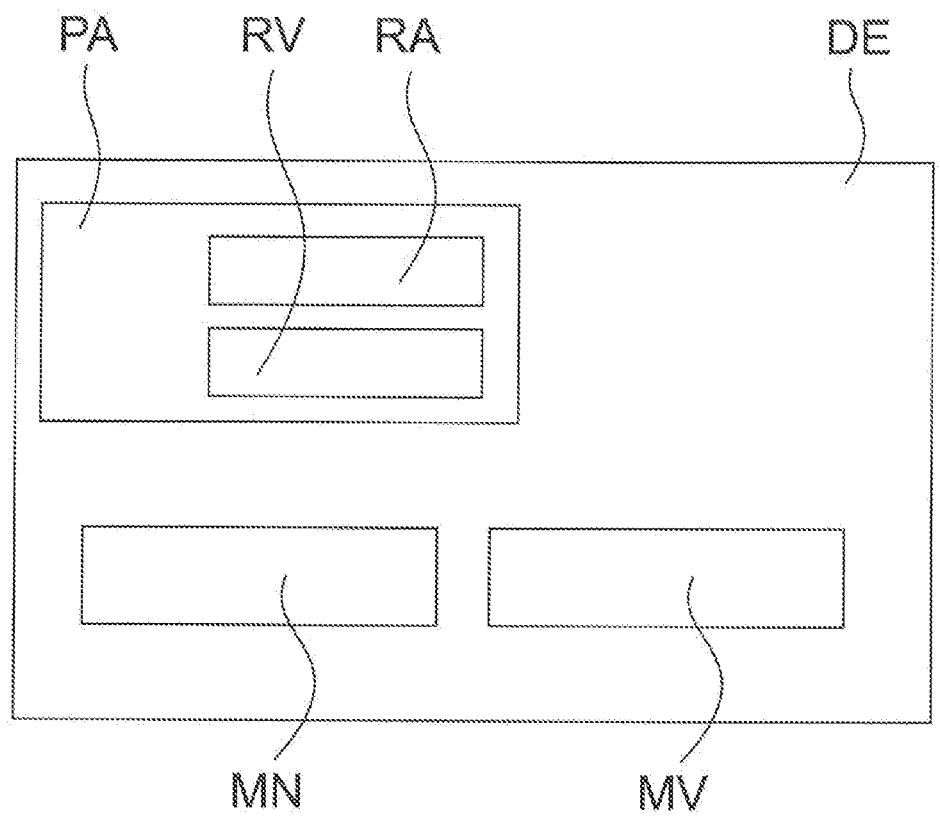
FIG. 1, an electronic device which implements a method according the invention, as well as an example of a node.
Figure 1B:
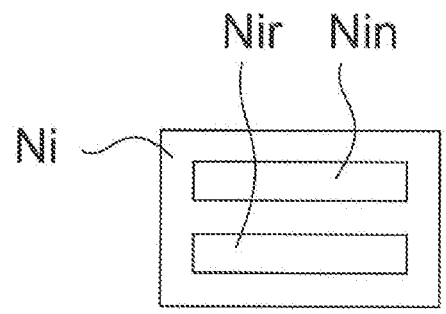
Figure 2:
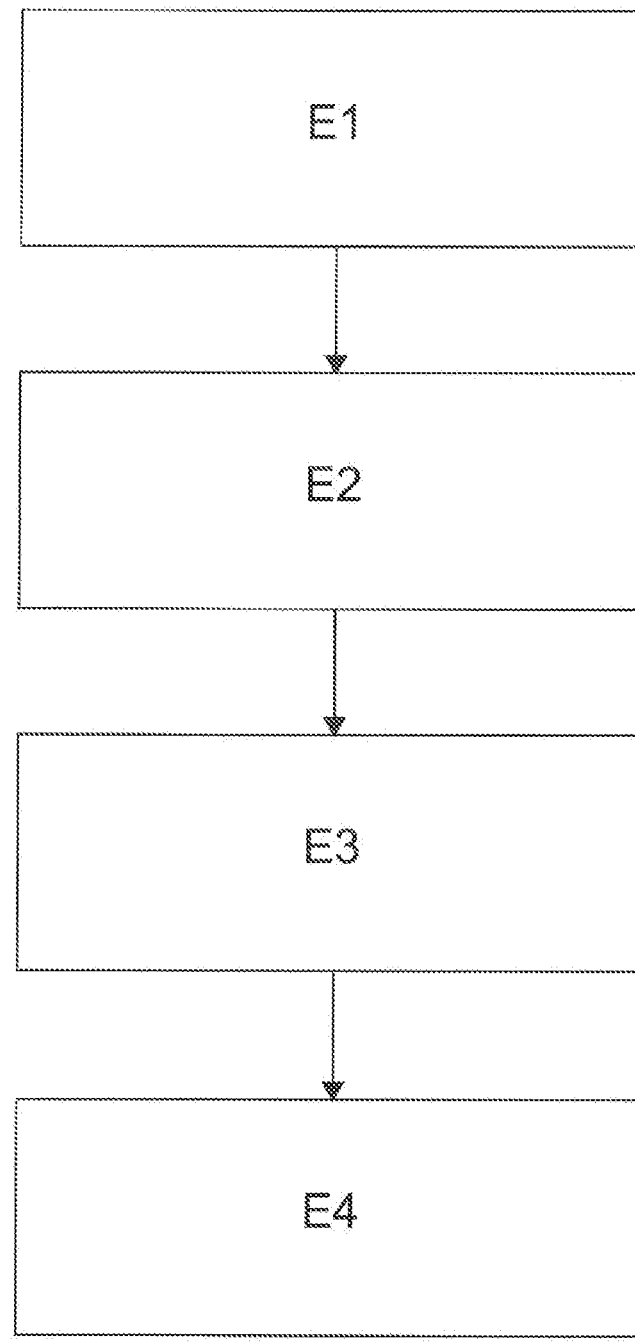
FIG. 2, a flow-chart of an embodiment of the method according to the invention.

According to a first embodiment, shown in FIGS. 1A-B and 2, the invention relates to an electronic device DE comprising a non-volatile memory MN, a random-access memory MV and a display chip PA, said display chip PA comprising a video output register RV and a display register RA. The invention also relates to a display method using a display chip to be implemented in such an electronic device.

The random-access memory MV may consist of a dedicated memory of the chip PA or a RAM (Random Access Memory) intended for an operating system. The non-volatile memory MN may consist of a hard disk or of a flash memory.

The method according to the invention comprises a first static programming phase comprising a configuration step E1 of the video output RV. This step may, for example, consist of configuration of the video output register RV so as to obtain a progressive or interlaced display.

The first phase of the method moreover comprises a step E2 for writing n images into the random-access memory MV where n is an integer equal to or greater than two. Since an animation is made up of at least two images, it is necessary for this writing step to involve at least two images. Thus during this step the images which make up the animation are copied from the non-volatile memory MN into the random-access memory MV.

The first phase of the method moreover comprises a step E3 for writing a plurality of nodes Ni into the random-access memory. The term 'plurality of nodes Ni' refers here to a chained configuration table such that each node Ni comprises the random-access memory address Nin of at least one part of an image as well as the random-access memory address Nir of the following node, where the last node then comprises the random-access memory address of the first node N1.

The first phase of the method also comprises a step E4 for configuration of the display register RA. This step may involve copying the first node of the plurality of nodes Ni loaded into the random-access memory to the display register RA.

The method according to the invention also comprises a second phase for reading of n images by said display chip (PA), said reading being achieved using the display register (RA) so as to display said animation.

In the method according to the invention, the configuration of the registers is carried out statically. In other words, once configured, the registers are not reconfigured and the animation is produced by taking advantage of the operation of the display chip. In other words, the method according to the invention may be used without any specific adaptation of the display chip and allows the latter to display an animation through a static configuration of the display register and of the video output register.

As explained above, the display chip PA displays the image or the part of the image whose address is comprised in a first node loaded into the display register RA. Once this image or this part of an image is displayed, a second node whose random-access memory address MV is comprised in the first node is in turn loaded into the display register RA. In this manner, the chip successively copies the nodes of the plurality of nodes Ni from the random-access memory into the display register.

It will therefore be understood that the step E3 for writing the plurality of nodes Ni is a function of the display node chosen during the step E1 for configuration of the video output register RV.

In one embodiment, the display mode is a progressive display mode. The step E3 for writing the plurality of nodes Ni is then carried out such that each node Ni comprises the address Nin of an image as well as the address Nir of the following node, the last node comprising the address of the first node N1. By configuring the nodes Ni in this way and with the display being achieved in progressive mode, the reading of a node Ni by the display chip PA leads to the display of an image. With each node Ni relating to an image, the animation will be achieved by the display chip PA reading the plurality of nodes Ni. Taking the example of a refresh rate of 60 Hz, the maximum animation speed is therefore 30 cycles per second. The nodes Ni could however be imagined as being configured in such a way that a plurality of nodes point to the same image in order to modulate the animation rate.

Figure 3:
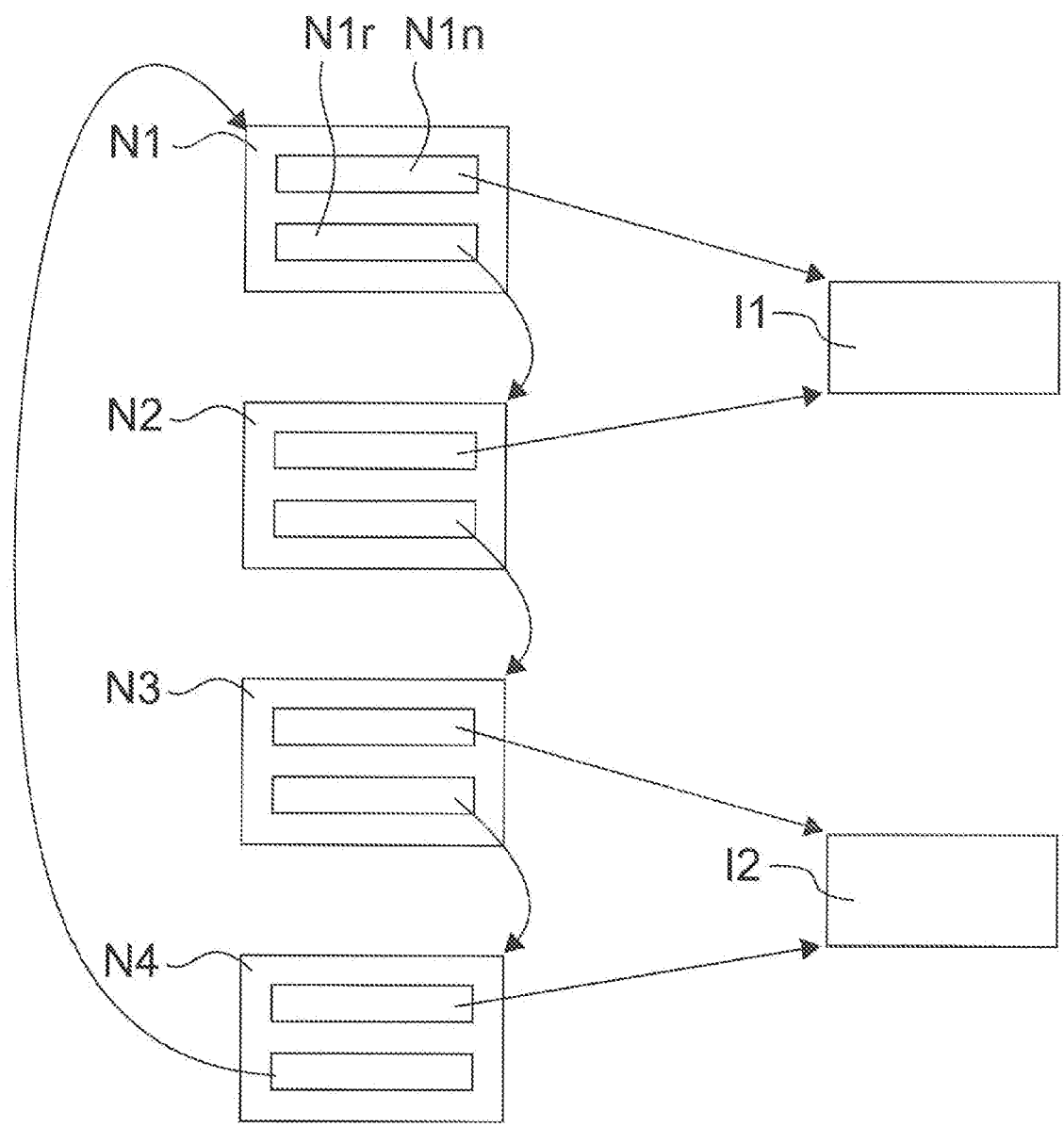
FIG. 3, a first embodiment example of a method according to the invention.

In an embodiment example shown in FIG. 3, the first node N1 includes the random access memory address N1n of the image I1 as well as the random access memory address of the following node N2. The node N2 includes the random access memory address of the image I1 as well as the random access memory address of the following node N3. The third node N3 includes the random access memory address of the image I2 as well as the random access memory address of the node N4. The node N4 includes the random access memory address of the image I2 as well as the random access memory address of the first node N1, where the node N4 is the last node of the plurality of nodes. By scanning the four nodes N1, N2, N3 and N4, the display chip successively and cyclically displays two images I1, I2 thus producing an animation. When the refresh rate is 60 Hz, an animation is therefore obtained with a duration of ⅕₅ of a second, in other words 15 animation cycles per second. The nodes may also be configured such that the first 30 nodes contain the random-access memory address of a first image and the following 30 nodes contain the random access memory address of a second image. In this case the animation rate is not more than 2 images per second, in other words, one animation cycle per second. Thus the playback of the animation may be modulated by altering the number of nodes containing the random-access memory address of the various images of which the animation is comprised.

In an alternative embodiment, the display mode is an interlaced display mode, and each image is divided into a first frame known as the odd frame, comprising the odd lines of the image and a second frame, known as the even frame which comprises the even lines of the image. The step E3 for writing the plurality of nodes Ni is then carried out such that each node Ni comprises the address Nin of frame of an image as well as the random access memory address Nir of the following node, where the last node comprises the random-access memory address of the first node N1. By configuring the nodes Ni in this way, the frames of the images will are ensured to be displayed one after the other. Since the display is achieved using interlaced mode, reading a node Ni leads to a frame being displayed. Two nodes must therefore be scanned to display an image. Since each node Ni is related to a frame of an image, the animation comprising n images is achieved by reading at least 2n nodes.

Figure 4:
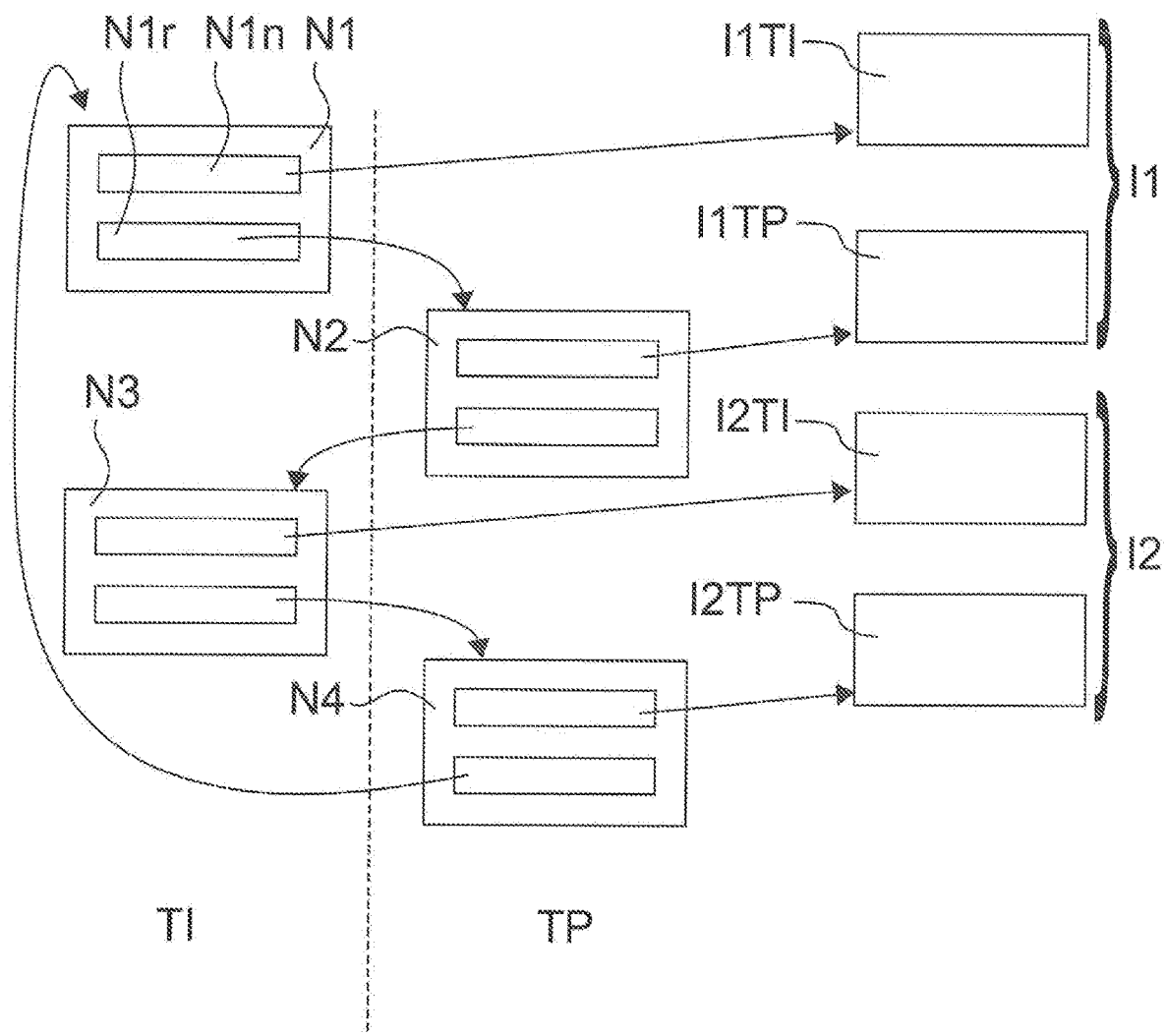
FIG. 4, a second embodiment example of a method according to the invention.

In an example shown in FIG. 4, the nodes N1 and N3 each correspond to an odd frame TI and nodes N2 and N4 each correspond to an even frame TP. The first node N1 includes the random-access memory address N1n of the odd frame I1TI of a first image I1 as well as the random-access memory address N1r of the second node N2. The second node N2 includes the random-access memory address of even frame I1TP of the image I1 as well as the random-access memory address of the node N3. The node N3 comprises the random-access memory address of the odd frame I2TI of a second image I2 as well as the random-access memory address of the fourth node N4. The node N4 includes the random-access memory address of the even pair I2TP of the image I2 as well as the random access memory address of the first node N1, where the node N4 is the last node. If a refresh rate of 60 Hz is assumed, an alternation is obtained between the two images every ⅕₅ of a second. In other words, the maximum animation speed is 1 cycle per second. Configuration of the nodes Ni can be imagined, however, such that a plurality of nodes Ni point towards a given image in order to be able to modulate the animation speed. In other words, a first node points towards the odd frame of an image and the following node points towards the even node of the same image, in a manner which is repeated over several pairs of consecutive nodes. The nodes could be configured, for example, in such a way that the first 30 nodes point to a first image (15 of the nodes pointing towards the odd frame of the first image and 15 nodes pointing towards the even frame of the first image) and the following 30 nodes point towards a second image (15 nodes pointing towards the odd frame of the first image and 15 nodes pointing towards the even frame of the first image). The speed of animations is not more than 2 images per second. In other words, the animation speed is not more than 1 cycle per second.

Irrespective of the display mode chosen, the step E2 for writing n images in the random-access memory RV can be achieved in two different ways.

In one embodiment, a starting program is in charge of loading an operating system into memory and the n images are stored in said starting program. The latter are then written into the random-access memory MV at the same time as the starting program. In other words, in this embodiment the loading of the images into the random-access memory MV is performed out by the elementary input/output system. Since the images are available as soon as the starting program is loaded into memory, the elementary input/output system may also be in charge of the step for configuration of the registers, which means that the animation can be displayed from the first moments of starting onwards, immediately after loading of the starting program, and therefore of the images, into the random access memory MV. This embodiment allows all the elements necessary for the display to be loaded in a single step. The elementary input/output system may be a BIOS (Basic Input Output System) or a security co-processor. The term 'security co-processor' relates to a logic unit responsible for initialisation of the random-access memory MV, for the verification of the starting program by verification of a fingerprint of the latter, and for loading the starting program into the random-access memory MV. However, if the number of or the resolution of the images is high, amount of starting program memory into which the images have been incorporated may become large, which may slow down the operation for verifying the integrity of the starting program by the elementary input/output system.

Another embodiment may therefore be envisaged wherein the n images are stored in the non-volatile memory MN of the electronic device DE, independently of the starting program, and are loaded into the random-access memory MV by the starting program after said starting program is loaded. Thus the memory footprint of the starting program is reduced. In this embodiment, the starting program may be in charge of the configuration of the video output register RV and display registers RA.

In one embodiment, the n images are stored in the form of compressed images, allowing the memory footprint of the images to be reduced. A compression algorithm of the RLE (Run Length Encoding) type may be envisaged. More generally, any compression algorithm supported by the display chip PA may be used. It may therefore be a proprietary compression algorithm.

In one embodiment, writing of the n images into the random-access memory is carried out in a reserved zone of the random-access memory MV. This allows all the images to be retained in memory once the operating system is loaded by preventing the images being overwritten by at least a part of the operating system code. In effect there is a delay between the moment at which the operating system is loaded into memory and the moment at which the operating system effectively takes control of the display chip PA. Ensuring that the images are still in memory after loading the operating system guarantees that the animation is still displayed up until the operating system actually takes control of the display chip.

In one embodiment the animation may be broken down into a first graphics plane and into a second graphics plane, where the first graphics plane constitutes the fixed part of the animation and the second graphics plane constitutes the changing part of the animation, where the display chip comprises means for superimposing the first graphics plane onto the second graphics plane.

When the display is achieved using progressive mode, the step for writing a plurality of nodes into the random-access memory then comprises two sub-steps:
- a first sub-step for writing into random-access memory of a node comprising the random-access memory MV address of an image intended to be displayed in the first graphics plane, where the node moreover comprises its own address;
- a second sub-step for writing a plurality of nodes Ni, each node comprising the random-access memory MV address of an image intended to be displayed in the second graphics plane as well as the random-access memory MV address of the following node, where the last node comprises the random-access memory MV address of the first node.

Alternatively, when the display is achieved using interlaced mode, the step for writing into the random-access memory of a plurality of nodes comprises two sub-steps:
- a first sub-step for writing a first node and a second node, where the first node comprises the random-access memory MV address of the odd frame of an image intended to be displayed in the first graphics plane as well as the random-access memory MV address of the second node, the second node comprising the random access memory MV address of the even frame of the image intended to be displayed in the first graphics plane as well as the random access memory MV address of the first node;
- a second sub-step for writing a plurality of nodes Ni, where each odd node comprises the random-access memory MV address of the odd frame of an image intended to be displayed in the second graphics plane and each even node comprising the random access memory MV address of the even frame of an image intended to be displayed in the second graphics plane, where the last node comprises the random-access memory MV address of the first node.

Thus in these embodiment alternatives, animation is only possible insofar as the number of images is greater than three. The animation is broken down into two parts: a first part relating to the fixed elements of the animation which will constitute the first graphics plane, a second part relating to the moving elements of the animation. For example, in the case of an animation which comprises a background on which a point flashes, the first plane will be made up of the background and the second plane will be made up of the flashing point. In this example the display of the background, that is of the first graphics plane, will be achieved using a single node or a pair of nodes comprising the random-access memory of the background image whereas the display of the second graphics plane will be achieved using a plurality of nodes Ni as explained above. This is naturally only an example and a second plane may be envisaged which is made up of a more complex animation comprising a greater number of images, if necessary associated with a greater number of nodes.

In both these alternative embodiments the step E4 for configuration of the display register RA may involve assigning a memory location of the display register RA to each graphics plane, of copying, to a first location of the display register RA, the node (in the case of a progressive display) or the first node of the pair of nodes (in the case of an interlaced display) which corresponds to the first graphics plane, and of copying, to a second memory location of the display register RA, the first node of the plurality of nodes Ni loaded into the random-access MV memory corresponding to the second graphics plane. The reading of each of these memory locations is carried out in the same manner as in the case of a sole graphics plan described above, that is, by displaying the image or the frame of the image whose random-access memory MV address is contained in a first node and by then loading the following node whose random-access memory MV address MV is contained in the first node. Since both memory locations are read simultaneously, a display of two graphics planes is obtained, with the second graphics plane being superimposed on the first graphics plane.

The invention claimed is:

1. A method for display of an animation by a display chip of an electronic device, said electronic device comprising a non-volatile memory and a random-access memory, said display chip comprising a video output register and a display register, the method comprising:
   a first static programming phase, the first static programming phase comprising:
      configuring the video output register;
      writing n individual images into the random-access memory, where n is an integer equal to or greater than two, said n individual images collectively forming said animation to be displayed on a display device;
      writing a plurality of nodes into the random-access memory such that each node comprises the random-access memory address of at least a part of one image from amongst the n individual images, as well as the random-access memory address of the following node, wherein a last node of the plurality of nodes comprises the random access memory address of the first node;
      configuring the display register, the configuring comprising copying the first node of the plurality of nodes loaded into the random-access memory to the display register;
   the method further comprising a second phase for reading the n individual images by said display chip, said reading being performed using the display register, said first static programming phase and said second phase being carried out during a starting phase of the electronic device, said display register scanning the plurality of nodes so as to display said animation during said starting phase,
      wherein the starting phase is carried out by first loading, by an elementary input/output system of the electronic device, a starting program stored in the non-volatile memory into the random-access memory, the starting program being in charge of starting an operating system, wherein the n individual images are included in said starting program such that each of the n individual images that collectively form the animation is written into the random-access memory during said first loading of the starting program from the non-volatile memory into the random-access memory.

2. The method according to claim 1, wherein the n individual images are stored in compressed form.

3. The method according to claim 1, wherein writing of the n individual images into the random access memory is carried out in a reserved zone of said random-access memory.

4. The method according to claim 1, wherein the configuration of the video output register during the video output register configuration step is performed in such a way that the display is carried out in progressive mode and wherein each node comprises the random-access memory address of an image.

5. The method according to claim 4, wherein the animation is broken down into a first graphics plane and into a second graphics plane, wherein the first graphics plane constitutes a fixed part of the animation and the second graphics plane constitutes a changing part of the animation, wherein the display chip comprises a memory that is coded with instructions to direct the display chip for superimposing the first graphics plane onto the second graphics plane; and wherein the writing of a plurality of nodes into the random-access memory comprises two sub-steps:
  a first sub-step of writing a node comprising the random-access memory address of an image intended to be displayed in the first graphics plane, wherein the node moreover comprises its own address in random-access memory address;
  a second sub-step of writing a plurality of nodes, each node comprising the random access memory address of an image intended to be displayed in the second graphics plane as well as the random-access memory address of the following node, with the last node comprising the random-access memory address of the first node.

6. The method according to claim 1, wherein the configuration of the video output register during the video output register configuration step is carried out in such a way that the display is made in interlaced mode, wherein the plurality of nodes comprise even nodes and odd nodes, and wherein each odd node comprises the random-access memory address of an odd frame of an image and each even node comprises the random access memory address of an even frame of an image.

7. The method according to claim 6, wherein the animation is broken down into a first graphics plane and into a second graphics plane, wherein the first graphics plane constitutes the fixed part of the animation and the second graphics plane constitutes the changing part of the animation, wherein the display chip comprises a memory that is coded with instructions to direct the display chip for superimposing the first graphics plane onto the second graphics plane; and wherein the step for writing a plurality of nodes into the random-access memory comprises two sub-steps:
  a first sub-step of writing a first node and a second node, wherein the first node comprises the random-access memory address of the odd frame of an image intended to be displayed in the first graphics plane as well as the random-access memory address of the second node, wherein the second node comprises the random access memory address of the even frame of the image intended to be displayed in the first graphics plane as well as the random access memory address of the first node;
  a second sub-step of writing a plurality of nodes, wherein each odd node comprises the random-access memory address of the odd frame of an image intended to be displayed in the second graphics plane and each even node comprises the random access memory address of the even frame of an image intended to be displayed in the second graphics plane, wherein the last node comprises the random access memory address of the first node.

8. An electronic device comprising a non-volatile memory, a random-access memory and a display chip, said display chip comprising a video output register and a display register; the electronic device being configured to implement the method according to claim 1.

9. A non-transitory computer readable medium comprising instructions for performing the method according to claim 1.

* * * * *